United States Patent
Park

(10) Patent No.: US 7,065,612 B2
(45) Date of Patent: Jun. 20, 2006

(54) PROCESSOR HAVING CACHE STRUCTURE AND CACHE MANAGEMENT METHOD FOR ELEVATING OPERATION SPEED

(76) Inventor: Sung-bae Park, 736-903, Daerim Solgeo Apt., Sanbon-dong, Gunpo-city, Kyungki,do (KR)

( * ) Notice: Subject to any disclaimer, the term of this patent is extended or adjusted under 35 U.S.C. 154(b) by 259 days.

(21) Appl. No.: 10/396,154

(22) Filed: Mar. 25, 2003

(65) Prior Publication Data
US 2004/0049635 A1    Mar. 11, 2004

(30) Foreign Application Priority Data
Sep. 9, 2002    (KR) ...................... 10-2002-0054258

(51) Int. Cl.
*G06B 12/00* (2006.01)
(52) U.S. Cl. ........................ 711/125; 711/118; 711/123; 712/205; 712/207; 712/237; 712/244
(58) Field of Classification Search .............. 711/118, 711/125, 129, 123; 712/233, 244
See application file for complete search history.

(56) References Cited

U.S. PATENT DOCUMENTS 5,926,841 A * 7/1999 Novak et al. ................ 711/208
6,341,324 B1 * 1/2002 Caulk et al. ................. 710/260
6,625,693 B1 * 9/2003 Arora et al. ................. 711/125
6,640,284 B1 * 10/2003 Shaw et al. .................. 711/129

* cited by examiner

Primary Examiner—Gary Portka
Assistant Examiner—Jasmine Song
(74) Attorney, Agent, or Firm—F. Chau & Associates, LLC

(57) ABSTRACT

A processor having a cache memory structure which improves an operation speed of the processor and a method of managing cache memory of the processor are provided. The cache memory is divided into a cache memory for normal programs which stores instructions required for running normal programs and a cache memory for exception programs. An instruction register fetches and stores instructions from one of the cache memories according to the type of program currently running. The method includes dividing the cache memory into a cache memory for normal programs and a cache memory for exception programs, storing instructions and/or data for running the normal and exception programs in their respective cache memories, determining a type of a currently running program, fetching instructions from either cache memory according to the type of program currently running, and inputting the fetched instructions to the instruction register.

8 Claims, 2 Drawing Sheets

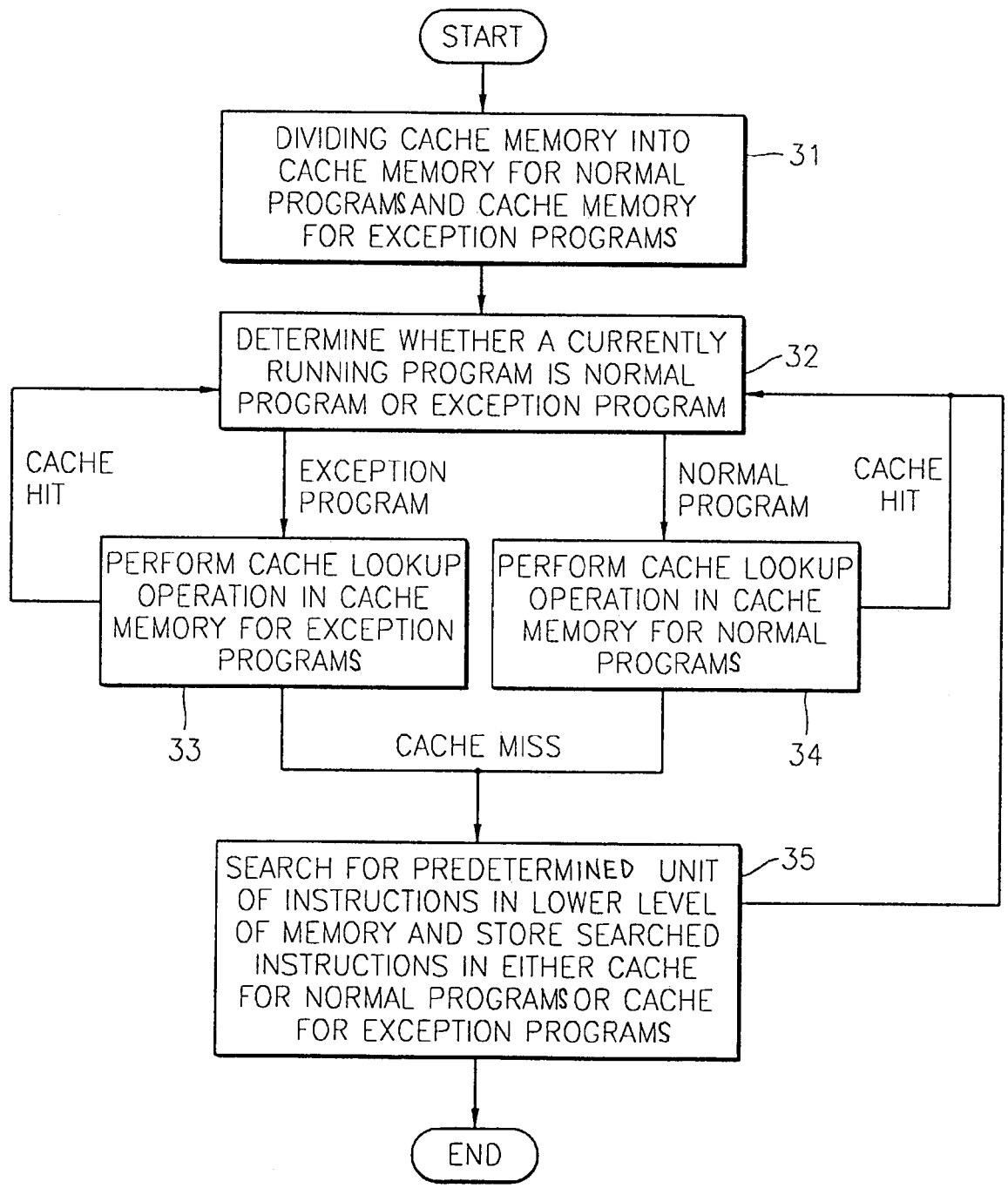

PROCESSOR HAVING CACHE STRUCTURE AND CACHE MANAGEMENT METHOD FOR ELEVATING OPERATION SPEED

CROSS-REFERENCE TO RELATED APPLICATION

This application claims priority to Korean Patent Application No. 2002-54258, filed Sep. 9, 2002, in the Korean Intellectual Property Office, the disclosure of which is incorporated herein in its entirety by reference.

BACKGROUND OF THE INVENTION

1. Field of the Invention

The present invention relates to the field of computer systems, and more particularly, to a cache structure and a cache management method of a processor.

2. Description of the Related Art

In general, a computer system includes a processor and memory. In many cases, the operation speed of the processor exceeds the operation speed of the memory. This is due to the fact that high-speed memory is expensive and thus not abundant in most computer systems.

Referring to FIG. 1, most computer systems have a hierarchical memory structure including high-speed memory such as cache memories 12 and 14, middle-speed memory such as a main memory 16, and low-speed memory such as a hard disk 18. Since the cost of memory decreases as its operation speed decreases, most computer systems are equipped with a large amount of low- and medium-speed memory in order to increase the total memory capacity of the system without greatly increasing the system's cost.

The cache memories 12 and 14 themselves represent a hierarchical structure. Cache memory 12 is an on-chip cache included inside a processor chip 10, and cache memory 14 is an off-chip cache located outside the processor chip 10. The on-chip cache 12 is generally called a first cache or L1 cache and the off-chip cache 14 is called a second cache or L2 cache.

The cache memories 12 and 14 store instructions and/or data from the main memory 16. A cache lookup operation, in which instructions and/or data that the processor 10 desires are searched for, is firstly performed in the first cache memory 12. If the desired instructions and/or data are not found in the first cache memory 12, that is, if a cache miss occurs, a lower level of memory such as the second cache memory 14 or the main memory 16 is searched for the instructions and/or data. Once the instructions and/or data are found, they are stored in the first cache memory 12.

The processor 10 is often required to process exception programs such as an interrupt process routine, an exception process routine, a reset process routine or the like while running a normal program. When this occurs, the processor 10 temporarily stops the normal program to run the exception program and then goes back to running the normal program. In doing so, the instructions and/or data required by the processor 10 change back and forth, and instructions and/or data not needed at a particular time are often deleted from the first cache memory 12. Subsequently, when deleted instructions and/or data are needed again but found absent in the first cache memory 12, the second cache memory 14, and sometimes the lower level memories, must be searched, creating a delay. This delay decreases the response speed of the processor 10 to the exception programs and generally inhibits high-speed operation of the processor 10.

SUMMARY OF THE INVENTION

It is an aspect of the present invention to provide a processor having a cache structure for improving an operation speed of the processor by reducing the time necessary for converting between a normal program and an exception program.

It is another aspect of the present invention to provide a method of managing cache memory for improving the operation speed of a processor.

According to an aspect of the present invention, there is provided a processor including a cache memory for normal programs which stores instructions required for running normal programs and a cache memory for exception programs which stores instructions required for running exception programs and an instruction register which fetches instructions from either the cache memory for normal programs or the cache memory for exception programs, and stores the instructions, wherein the processor determines whether a currently running program is a normal program or an exception program and fetches instructions from either the cache memory for normal programs or the cache memory for exception programs according to a result of the determination, to input the fetched instructions to the instruction register.

Preferably, the processor generates a predetermined control signal and further comprises a multiplexer which selects one instruction from either the cache memory for normal programs or the cache memory for exception programs according to the predetermined control signal, and provides the selected instruction to the instruction register.

According to another aspect of the present invention, there is provided a method of managing cache memory of a processor comprising the steps of (a) dividing the cache memory into a cache memory for normal programs and a cache memory for exception programs, (b) storing instructions and/or data for running the normal programs in the cache memory for normal programs and instructions and/or data for running the exception programs in the cache memory for exception programs and (c) determining whether a currently running program is a normal program or an exception program, fetching instructions and/or data from either the cache memory for normal programs or the cache memory for exception programs according to a result of the determination, and inputting the fetched instructions and/or data to an instruction register.

Preferably, the method further comprises the steps of (d) if a cache miss occurs, searching for desired instructions and/or data in a lower level of memory and, once found, storing the desired instructions and/or data in either the cache memory for normal programs or the cache memory for exception programs.

According to another aspect of the present invention, there is provided a method of managing cache memory of a processor comprising the steps of (a) dividing the cache memory into a cache memory for normal programs and a cache memory for exception programs, (b) determining whether a currently running program is a normal program or an exception program, (c) performing a cache lookup operation to find desired instructions and/or data and (d) if a cache miss occurs as a result of step (c), searching for the desired instructions and/or data from a lower level of memory and, once found, storing the desired instructions and/or data in either the cache memory for normal programs or the cache memory for exception programs according to a result of step (b).

Preferably, step (c) is characterized by performing the cache lookup operation in the cache memory for normal programs when it is determined in step (b) that the currently running program is a normal program, and performing the cache lookup operation in the cache memory for exception programs when it is determined in step (b) that the currently running program is an exception program.

BRIEF DESCRIPTION OF THE DRAWINGS

The above aspects and advantages of the present invention will become more apparent by describing in detail preferred embodiments thereof with reference to the attached drawings in which:

FIG. 3 is a flowchart showing a method of managing cache memory according to an embodiment of the present invention.

DETAILED DESCRIPTION OF THE INVENTION

The present invention now will be described more fully with reference to the accompanying drawings, in which preferred embodiments of the invention are shown.

Figure 1:
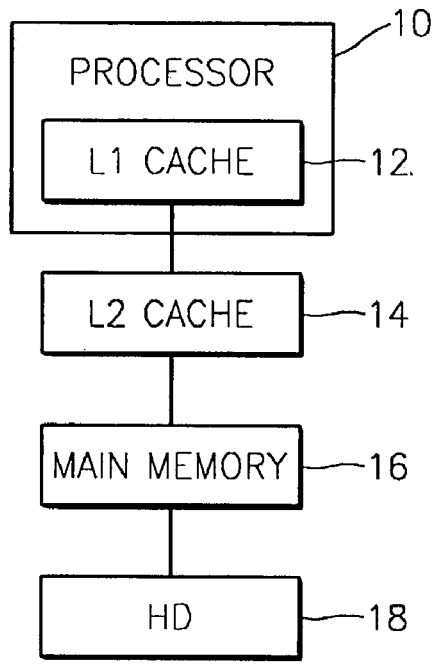
FIG. 1 is a view of the hierarchical structure of memory in a conventional computer system.
Figure 2:
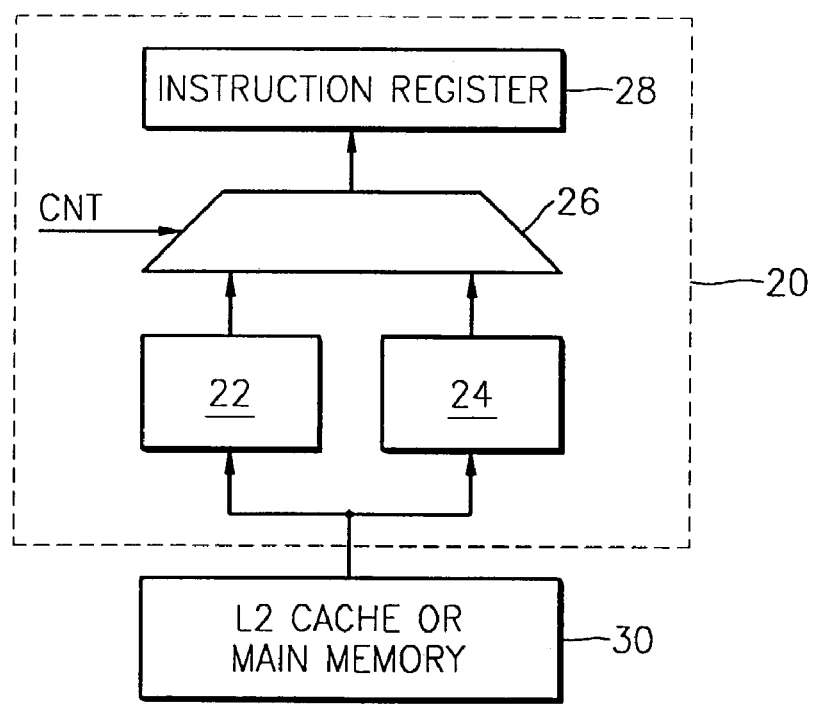
FIG. 2 is a block diagram of a cache structure of a processor according to an embodiment of the present invention.

FIG. 2 is a block diagram of a cache structure of a processor according to an embodiment of the present invention. Referring to FIG. 2, a processor 20 according to one embodiment of the present invention includes cache memories 22 and 24, a multiplexer 26 and an instruction register 28.

The cache memories 22 and 24 include a cache memory for normal programs 22 and a cache memory for exception programs 24. The cache memory for normal programs 22 stores instructions necessary for running normal programs, while the cache memory for exception programs 24 stores instructions necessary for running exception routines such as an interrupt process routine, a reset process routine, an exception process routine, and the like.

Here, an interrupt process routine is triggered by an unexpected event which occurs outside the processor such as an input/output device request, and an exception process routine is triggered by an unexpected event which occurs inside the processor such as an arithmetic overflow. Such exception programs are smaller than normal programs and so all instructions necessary for running them can be stored in the cache memory for exception programs 24.

In addition, the cache memory for exception programs 24 is capable of storing a subroutine generally used in normal programs. For example, a frequently called subroutine in normal programs, e.g., 'printf', can be stored in the cache memory for exception programs 24 together with exception programs, rather than in the cache memory for normal programs 22.

The processor 20 performs cache lookup operations in the cache memories 22 and 24, so as to fetch instructions necessary for running programs. Here, it is preferable that the processor 20 first determines whether a currently running program is a normal program or an exception program, and then performs the cache lookup operation in the cache memory for normal programs 22 when the currently running program is a normal program and in the cache memory for exception programs 24 when the currently running program is an exception program.

If a cache miss occurs after the cache lookup operation, the processor 20 searches a lower level of memory such as a second cache or main memory 30. Upon finding the desired instructions, the processor 20 stores the instructions in either the cache memory for normal programs 22 or the cache memory for exception programs 24.

Subsequently, the instructions stored in either the cache memory for normal programs 22 or the cache memory for exception programs 24 are provided through the multiplexer 26 to the instruction register 28, which memorizes an instruction to be carried out at a present time. The multiplexer 26 selects one of the instructions provided by the cache memory for normal programs 22 and the cache memory for exception programs 24 and provides the selected instruction to the instruction register 28. The processor 20 controls the multiplexer 26 with a control signal CNT to input to the instruction register 28 instructions from the cache memory for normal programs 22 when running a normal program and instructions from the cache memory for exception programs 24 when running an exception program.

FIG. 3 is a flowchart showing a method of managing cache memory according an embodiment of the present invention. The method shown in FIG. 3 is performed by the processor of FIG. 2.

At first, cache memory is divided into a cache memory for normal programs and a cache memory for exception programs (step 31). The cache memory for normal programs is for storing instructions for running normal programs, and the cache memory for exception programs is for storing instructions for running exception programs.

Next, the processor determines whether a currently running program is a normal program or an exception program (step 32). After determination, a cache lookup operation is performed in the cache memory for normal programs when the currently running program is a normal program, and in the cache memory for exception programs when the currently running program is an exception program (steps 33 and 34).

If a cache miss occurs as a result of the cache lookup operation, the desired instructions are searched for in lower level memory and, once found, are stored in either the cache memory for normal programs or the cache memory for exception programs according to the result of step 32 (step 35).

In the above-described embodiment of the present invention, instruction storing cache memory is divided into the cache memory for normal programs and the cache memory for exception programs. However, data storing cache memory also can be divided likewise.

As described above, the time necessary for converting between a normal program and an exception program can be reduced by storing and managing instructions and/or data required for running normal programs and instructions and/or data required for running exception programs in separate cache memories.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A processor comprising:
   a cache memory for normal programs which stores instructions required for running normal programs and a cache memory for exception programs which stores instructions required for running exception programs; and
   an instruction register which fetches instructions from either the cache memory for normal programs or the cache memory for exception programs, and stores the instructions,
   wherein the processor determines whether a currently running program is a normal program or an exception program and fetches instructions from either the cache memory for normal programs or the cache memory for exception programs according to a result of the determination, to input the fetched instructions to the instruction register;
   wherein the processor generates a predetermined control signal and further comprises a multiplexer which selects one instruction from either the cache memory for normal programs or the cache memory for exception programs according to the predetermined control signal, and provides the selected instruction to the instruction register.

2. The processor of claim 1, wherein the predetermined control signal is based on a type of the currently running program.

3. The processor of claim 1, wherein the exception programs comprise an interrupt process routine, an exception process routine, and a reset process routine.

4. The processor of claim 3, wherein the exception programs further comprise a predetermined subroutine for normal programs.

5. A method of managing cache memory of a processor, the method comprising the steps of:
   (a) dividing the cache memory into a cache memory for normal programs and a cache memory for exception programs;
   (b) storing instructions and/or data for running the normal programs in the cache memory for normal programs and instructions and/or data for running the exception programs in the cache memory for exception programs; and
   (c) determining whether a currently running program is a normal program or an exception program, fetching instructions and/or data from either the cache memory for normal programs or the cache memory for exception programs according to a result of the determination, and inputting the fetched instructions and/or data to an instruction register;
   wherein the exception programs further comprise a predetermined subroutine for normal programs.

6. The method of claim 5, further comprising the steps of:
   (d) if a cache miss occurs, searching for desired instructions and/or data in a lower level of memory and, once found, storing the desired instructions and/or data in either the cache memory for normal programs or the cache memory for exception programs.

7. The method of claim 6, wherein the exception programs comprise an interrupt process routine, an exception process routine and a reset process routine.

8. A method of managing cache memory of a processor, the method comprising the steps of:
   (a) dividing the cache memory into a first cache memory for normal programs and a second cache memory for exception programs, wherein the first cache memory and the second cache memory are physically separate;
   (b) determining whether a currently running program is a normal program or an exception program;
   (c) performing a cache lookup operation to find desired instructions and/or data; and
   (d) if a cache miss occurs as a result of step (c), searching for the desired instructions and/or data from a lower level of memory and, once found, storing the desired instructions and/or data in either the first cache memory for normal programs or the second cache memory for exception programs according to a result of step (b);
   wherein the exception programs comprise an interrupt process routine, an exception process routine and a reset process routine;
   wherein the exception programs further comprise a predetermined subroutine for normal programs.

* * * * *

UNITED STATES PATENT AND TRADEMARK OFFICE
CERTIFICATE OF CORRECTION

PATENT NO. : 7,065,612 B2  
APPLICATION NO. : 10/396154  
DATED : June 20, 2006  
INVENTOR(S) : Sung-bae Park It is certified that error appears in the above-identified patent and that said Letters Patent is hereby corrected as shown below:

<u>Title Page-</u>

Insert -   --(73) Assignee: Samsung Electronics Co., Ltd., Suwon-Si (KR)--

Signed and Sealed this

Eleventh Day of March, 2008

JON W. DUDAS  
*Director of the United States Patent and Trademark Office*